US006496980B1

United States Patent
Tillman et al.

(10) Patent No.: US 6,496,980 B1
(45) Date of Patent: Dec. 17, 2002

(54) METHOD OF PROVIDING REPLAY ON DEMAND FOR STREAMING DIGITAL MULTIMEDIA

(75) Inventors: Rachel E. Tillman, Portland, OR (US); Thomas R. Gardos, Portland, OR (US); John J. Kirby, Portland, OR (US); Jeff N. Kidder, Portland, OR (US); Rajeeb Hazra, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/206,791

(22) Filed: Dec. 7, 1998

(51) Int. Cl.[7] ............................................. H04N 7/173
(52) U.S. Cl. ........................ 725/90; 725/88; 725/102; 375/240.11
(58) Field of Search .......................... 708/203; 725/88, 725/90, 102; 375/240.1, 240.11, 240.19; 348/397.1, 398.1; 382/234

(56) References Cited

U.S. PATENT DOCUMENTS 5,585,852 A * 12/1996 Agarwal ................ 375/240.11
5,852,565 A * 12/1998 Demos ........................ 708/203
6,148,030 A * 11/2000 Katata ...................... 375/240.1
6,233,017 B1 * 5/2001 Chaddha ................ 375/240.12

* cited by examiner

Primary Examiner—Andrew Faile
Assistant Examiner—Hunter Lonsberry
(74) Attorney, Agent, or Firm—Steven F. Skabrat (57) ABSTRACT

High quality replay of a streaming multimedia video segment on demand is provided. The multimedia segment may be transmitted as a stream by a server system and received by a client system over a fixed bandwidth communications path. The client system receives a base layer of the stream, decodes the base layer and displays the decoded base layer at a first quality level. The client system stores at least a portion of the base layer in a cache. When a request for replay service for the multimedia segment is received from a user, for high quality replay, the client system may receive at least one enhancement layer of the stream corresponding to the stored portion of the base layer. The client system may then read the stored portion of the base layer from the cache, decode the stored portion of the base layer and the at least one enhancement layer, and display the decoded base and enhancement layers at a second quality level, higher than the first quality level.

42 Claims, 7 Drawing Sheets

METHOD OF PROVIDING REPLAY ON DEMAND FOR STREAMING DIGITAL MULTIMEDIA

BACKGROUND

1. Field

The present invention relates generally to processing of multimedia data signals in a system and, more specifically, to management of streaming digital multimedia data signals.

2. Description

Digital multimedia data signals may be communicated over a network from a signal source to a client system for viewing and/or listening by a user at the client site. In one scenario, a user requests the retrieval of a sequence of audio and/or video data signals, called a stream, from the signal source, which may be a server system communicating with the client system over the network. When the audio and video data signals making up the stream are received at the client, these multimedia data signals are processed to produce output data for the user in the form of sounds produced by one or more loudspeakers and/or images displayed on a display.

The concept of streaming multimedia includes a multimedia source sending a multimedia stream to a multimedia recipient for real-time presentation to a user. That is, streaming can be viewed as a "display/play" model as opposed to a more traditional "download and display/play" model, where the entire stream is collected by the recipient prior to presentation. Successful "display/play" streaming is based on the premise that the multimedia preparation (e.g., compression) and the transmission mechanism can feed the recipient at a rate fast enough for the multimedia stream to be presented in real-time. When this occurs, streaming of data representing live events becomes possible. Streaming may involve buffering a small amount of the stream prior to presentation, but the amount of buffering is typically small compared to the length of the entire stream. The rationale for buffering is typically to smooth out the jitter inherent in network-based transmission mechanisms (e.g., packet-based transports, etc.).

One difference between "streaming multimedia" and multimedia that has been downloaded (in part or in its entirety) prior to presentation is that streaming multimedia quality (for example, video clarity and frame-rate) may be determined, at least in part, by the bandwidth of the transmission mechanism. For downloaded multimedia, the quality of the presentation is typically unaltered from what it had been authored as; only the download times are affected by the bandwidth of the transmission channel. A second difference between the two models is that the download model does not work for "live" content. In a display/play model of a digital multimedia streaming system, the size of the displayed images and the overall quality of the audio and video presented to the user are limited at least in part by the bandwidth of the communications path between the signal source and the client. In some systems, a sufficient amount of audio and video data signals is received to display full-motion video and concurrent audio to the user in a real-time (or streaming) mode, although the size and quality of the displayed image may be inadequate or undesirable for some uses. If the bandwidth of the communications path could be expanded, then a larger image, a clearer image, or a smoother set of images could be presented to the user. However, in many systems, the communications path between the signal source and the client is a fixed, relatively low bandwidth communication channel having at least one bottleneck. For example, when the network is the Internet and the client is a computer system employing a modem with a purported maximum bandwidth of 56K bytes per second (bps), the modem may serve as an impediment to providing a clearer or larger display of the video images.

This limitation of a fixed bandwidth communications path for streaming digital multimedia data is one problem for a system wherein additional features, such as "instant replay", for example, are desired. For analog video, a recall or "instant replay" feature is typically provided by rapidly rewinding and replaying a magnetic video tape storing the audio and video data. However, for digital multimedia data streaming across a network to a client system, retransmission and replay of selected data signals may be constrained by a variety of limitations of the communications path, such as the server system acting as a signal source, or the client system. Further complications may arise if the multimedia data represents a live event being filmed and transmitted over the network in real-time. Storage of the received digital multimedia data for replay purposes in a buffer or cache at the client system may be impractical because of the large size of the video data. Even if some caching of the received data is performed at the client system, the quality of the replayed video may be impaired because of the limited amount of video data that may be stored for replay purposes.

Hence, a method of providing a high quality replay on demand feature for streaming digital multimedia data would be a valuable addition to the art.

SUMMARY

An embodiment of the present invention is a method of replaying on demand of a multimedia segment received in a digital multimedia stream representing the multimedia segment on a limited bandwidth communications path. The method includes storing at least a portion of a first layer of the digital multimedia stream in a memory and receiving a second layer of the digital multimedia stream corresponding to the stored portion of the first layer over the limited bandwidth communications path. The method further includes reading the stored portion of the first layer from the memory, decoding the stored portion of the first layer and the received second layer, and displaying the decoded first and second layers to the user.

Another embodiment of the present invention is an apparatus for providing replay on demand of a multimedia segment having digital multimedia data signals. The apparatus includes a decoder to receive and decode a base layer of a stream representing the multimedia segment and to receive and decode an enhancement layer of the stream, the enhancement layer corresponding to the base layer. The decoder may be coupled to a memory for storing the base layer, and to a graphical user interface, for displaying the decoded base layer of the stream as an original display of the multimedia segment at a first quality level, for receiving a request for replay of the multimedia segment, and for displaying the decoded base layer and the decoded enhancement layer of the multimedia segment at a second quality level in response to the request.

BRIEF DESCRIPTION OF THE DRAWINGS

The features and advantages of the present invention will become apparent from the following detailed description of the present invention in which.

DETAILED DESCRIPTION

An embodiment of the present invention includes a method and apparatus whereby a client system may display a replay on demand of streamed digital multimedia segments (such as video segments) to a user at a higher quality than the original stream that was transmitted by a signal source such as a server system. In one embodiment, the method may be accomplished using scaleable video coding and local processing on the client system. An embodiment of the present invention overcomes the limitations of a limited bandwidth communications path to provide high quality replays for streaming digital video, on demand. It allows the user of a client system to see additional detail of a live digital video stream, as well as slow motion instant replay video, on demand. Alternatively, a replay of a digital video segment may be performed at the same quality level at which the segment was originally processed.

Figure 1:
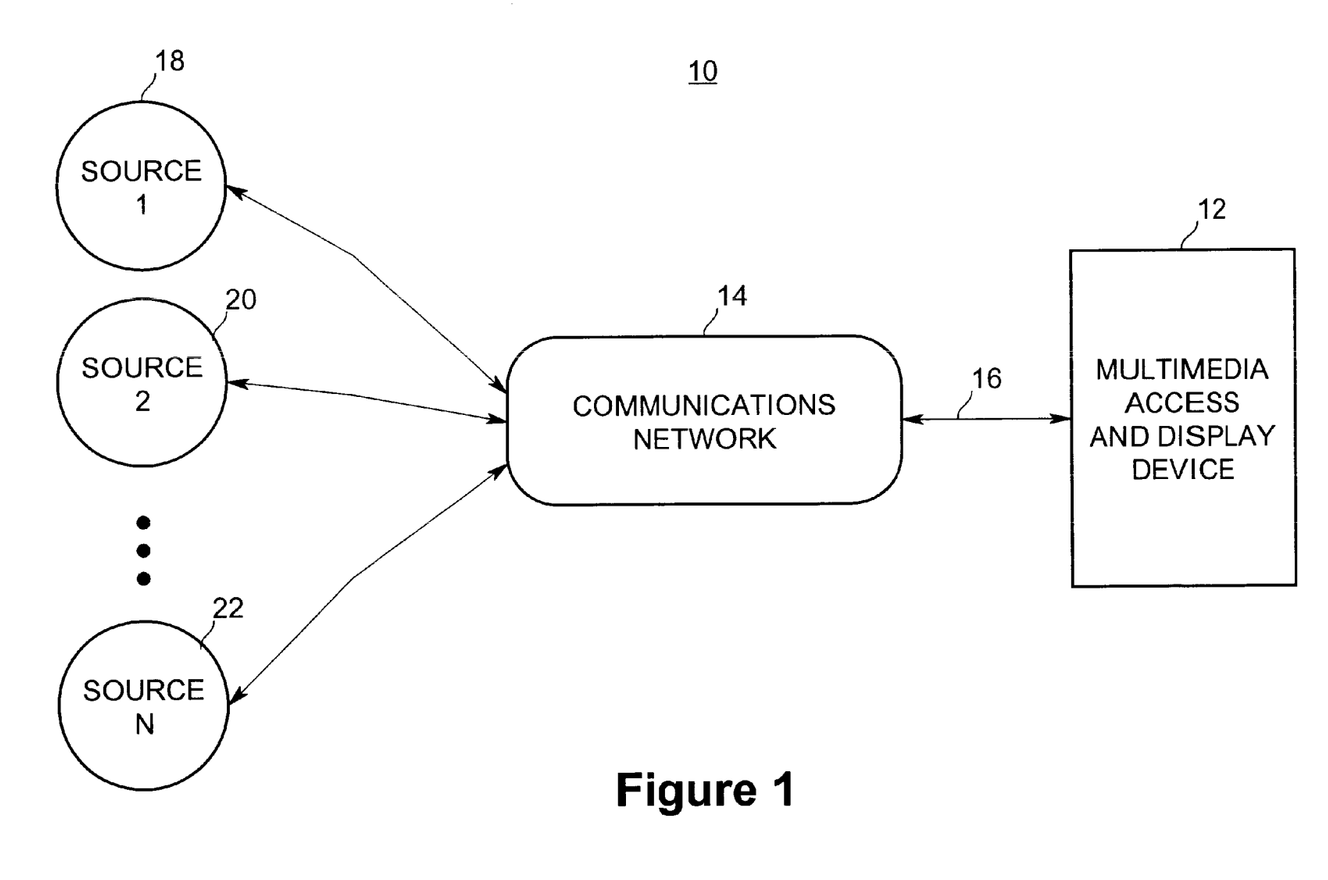
FIG. 1 is a diagram of a system for real-time multiple source digital video streaming over a communications network according to one embodiment of the present invention.

An embodiment of the present invention applies the replay concept to real-time digital video streaming over a communications channel with limited bandwidth (such as a dial-up Internet connection, for example). The digital video stream may represent live or prerecorded content. FIG. 1 is a diagram of a system 10 for real-time, multiple source, digital video streaming over a communications network according to one embodiment of the present invention. A multimedia access and display device 12 may be coupled to a communications network 14 by a communications path 16. Multimedia access and display device 12 may comprise any device for receiving, processing and displaying audio and video streams, such as, for example, a personal computer (PC) or other computer system having a display, a set-top box, an Internet appliance, a JAVA terminal, an information kiosk, or a digital television (DTV), although the invention is not limited in this respect. Communications network 14 may be any network for coupling computing devices such as, for example, a local area network (LAN), a wide area network (WAN), an intranet, or the Internet, although the invention is not limited in this respect. The connection between communications network 14 and multimedia access and display device 12 represented by communications path 16 may be any link with a predefined maximum data bandwidth, such as, for example, modem-based dial-up connections, various types of digital subscriber line (DSL) connections, cable modem connections, or network interface card (NIC) based intranet connections, although the invention is not limited in this respect. For purposes of this invention, a fixed maximum bandwidth for communications path 16 is assumed, however, the actual data rate for the communications path may vary with time without exceeding the maximum value. In addition, the present invention generally applies to any communications path, whether or not the communications path has a fixed bandwidth. The communications path may support bi-directional data flow (although not necessarily symmetrical in terms of bandwidth for each direction of data flow).

A plurality of signal sources, Source 1 18, Source 2 20, ..., Source N 22 may be coupled to communications network 14 to serve as multimedia content repositories accessed by multimedia access and display device 12. In one embodiment, the number of signal sources actively serving multimedia access and display device 12 may be only one. In other embodiments, any number of signal sources may be active and available for serving multimedia data streams to multimedia access and display devices at any time. Each signal source stores or has access to at least a portion of a digital multimedia content represented as a sequence of audio and/or video data signals called streams. The multimedia content may be stored at a signal source site in a main memory, a secondary memory, or a storage medium such as, for example, a CD-ROM, a digital versatile disk (DVD), or other suitable apparatus. As used herein, a stream comprises a plurality of audio and/or video data signals and the stream may comprise multiple layers. Each layer of a stream may comprise data from a source. The multimedia content may also be acquired in real-time from live audio and/or video sources such as, for example, a video camera and a microphone.

When a user of multimedia access and display device 12 desires to hear and/or view selected multimedia content, the user indicates his or her selection to multimedia access and display device 12 in any one of many well-known ways, such as, for example, by using a pointing device or keyboard and a graphical user interface and/or a browser application. In one embodiment, specific desired multimedia content may be identified by a uniform resource locator (URL) and/or identifiers according to the well-known hyper text transport protocol (HTTP), although the invention is not limited in scope in this respect. Multimedia access and display device 12 interacts with a signal source having the desired content to initiate the sending of a stream of audio and/or video data signals representing the desired content over communications network 14. Upon reception, multi-media access and display device produces audio and/or video output signals capable of being heard or seen by the user based at least in part on the received stream. In the case of video output data, the video may be displayed on a display (not shown), although the invention is not limited in this respect. In the case of audio output data, the audio may be produced by at least one loudspeaker (not shown), although the invention is not limited in this respect.

Figure 2:
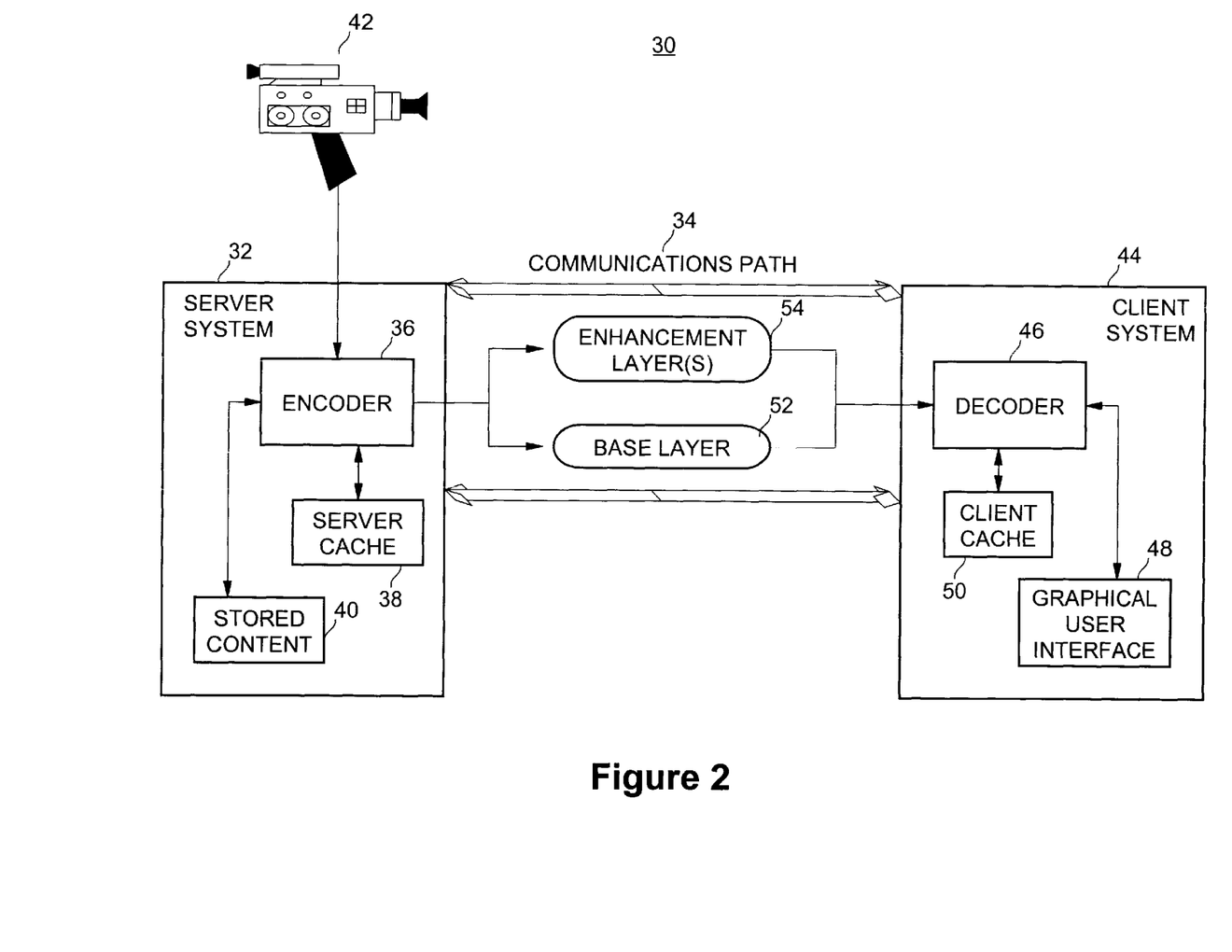
FIG. 2 is a diagram of a system for real-time digital video streaming of base and enhancement layers from a server to a client according to an embodiment of the present invention.

FIG. 2 is a diagram of a system for real-time digital video streaming of base and enhancement layers from a server to a client according to an embodiment of the present invention. In one embodiment, a signal source may comprise a server system 32 coupled to a communications path 34 (e.g., a computer network, such as the Internet). In various embodiments, the server system may be structured to provide streaming layered video streams authored to conform to International Telecommunications Union (ITU) Video Coding for Low Bit Rate Communication, Recommendation H.263, version 2, 1998 (also known as "H.263+"), and to accommodate network connections up to 56K BPS. The H.263+ specification provides for scaleable video coding by allowing the total bandwidth of a single stream to be divided into separate layers of data for a given video signal source, each layer corresponding to a different quality level associated with the video. Further information relating to layered streams may be found in Annex O of the H.263+ specification. The layered video encoding strategy employed by H.263+ implementations provides the capability to subscribe to multiple layers of a stream at different data rates.

Of course, the use of the H.263+ specification to define the format of the stream and the 56K BPS limit on the network connection is only representative of various embodiments of the present invention and the invention is not limited in scope in these respects.

Server system 32 comprises an encoder 36, a server cache 38, and, optionally, stored content 40. Encoder 36 operates to compress and encode H.263+ layered streams based on stored content 40 or live video data received from at least one camera 42 coupled to the server system. Stored content 40 may comprise any pre-recorded multimedia data resident on a machine readable medium, such as a digital video disk (DVD), CD-ROM, or a hard disk drive, for example. The camera may be used to capture live events in a digital form for transmission as digital video streams over a network. Server cache 38 may be used to store portions of a video stream prior to transmission over communications path 34.

A client system 44 (such as a personal computer system, for example) may be coupled to server system 32 as a multimedia access and display device via communications path 34. The communications path comprises a limited bandwidth communications link (for example, a 56K BPS link). Client system 44 may comprise a decoder 46 for decompressing and decoding H.263+ layered streams received by the client and a graphical user interface 48 for displaying the video data signals of the streams to the user and for accepting user input selections. Graphical user interface 48 may be used to select desired multimedia content, such as stored content 40 or live data from camera 42, as a signal source for a digital video stream. Corresponding audio data signals may also be transmitted to the client system on an audio stream. Graphical user interface 48 may also be used to receive and implement requests from a user for replay service, as described below. A memory, such as client cache 50, may be used to store selected portions of a video stream upon reception by the client system and prior to decoding by decoder 46.

In one embodiment, the digital video streams may be authored to support configurations in accordance with Annex O of the H.263+ specification. Annex O defines three scalability features termed temporal, signal to noise ratio (SNR), and spatial scalability. With temporal scalability, an encoder generates bi-directionally predicted frames (also called B frames). These frames support scalability in the sense that they may be discarded without hindering the decoding of surrounding frames in the stream. For example, these frames may be dropped at the decoder side to reduce the display frame rate (thus, scaling processor usage), or they may be dropped at the encoder side of a multi-point connection, to free up bandwidth on low capacity communications channels. B frames also offer the advantage that they may be compressed more efficiently than predicted (P) frames, at approximately the same quality level.

SNR scalability is a technique where the error introduced by compression is itself encoded and transmitted as a separate H263+ encoded picture. At the receiving end, this enhancement layer picture may be decoded and added back to the base picture to yield a higher quality image than if just a base picture was decoded. Since compression of the error picture is itself lossy, the remaining error after that compression may be interpreted as yet another picture, and may be compressed and transmitted as yet another enhancement layer. The H.263+ specification supports up to 14 enhancement layers in this manner, with the bandwidth allocated to each layer by an authoring application.

Spatial scalability is a variation of SNR scalability, where an enhancement layer may be four times as large (twice the dimensions) as the lower (or base) layer. This allows a common interchange format (CIF) Input sequence, for example, to be encoded as both a base layer quarter common interchange format (QCIF) sequence and an enhancement layer CIF sequence.

The video stream transmitted over the communications path 34 from the server system to the client system may comprise a base layer 52, one or more enhancement layers 54, or both. In one embodiment, the bandwidth of the communications path to the client system may be 32 Kbps (this is consistent with a 56 Kbps modem-based Internet connection) and the source video data stream may be structured as a sequence of 352 pixel×288 pixel frames, at a frame rate of 30 frames per second (fps).

The video stream may be authored (according to the H.263+ Specification) to support high-quality replay on demand as follows. The base layer may be communicated at 32 Kbps, and comprise 160 pixel×120 pixel frames at a frame rate of 15 fps. This base layer may be transmitted to the client system during "normal" play. The composition of the base layer may be as follows. A first frame in a sequence may be a key (I) frame with additional key frames inserted into the compressed stream once every 90 (coded) frames; note that there may be additional key frames inserted by the encoder between the forced key frames. Forward predicted (P) frames may be used between the key frames. An SNR enhancement layer may be communicated at 32 Kbps, and comprise 160 pixel×120 pixel frames at a frame rate of 15 fps. The SNR enhancement layer may comprise Enhancement Intra (EI) and Enhancement Predicted (EP) frames synchronized with the base layer as shown in FIG. 3.

Figure 3:
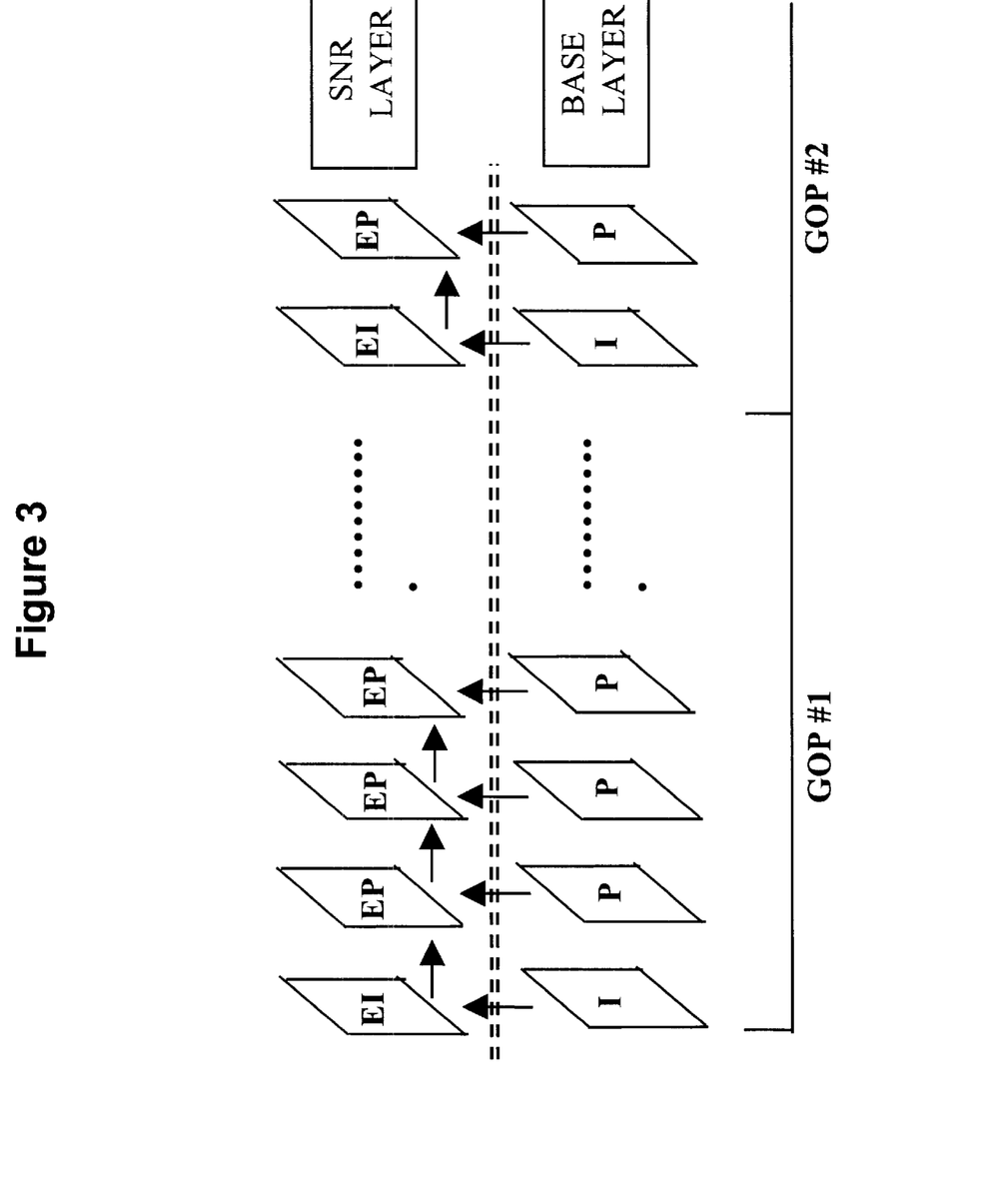
FIG. 3 is a diagram of a configuration of a stream according to one embodiment of the present invention.

As illustrated in FIG. 3, the configuration of the stream (base and enhancement layers) may be segmented into a series of Group Of Pictures (GOPs). Each GOP starts with a forced key (I or EI) frame that has no dependencies on (temporally) previous frames. In this example, therefore, a GOP in the base layer starts with a forced I frame followed by 89 P (and possibly some I) frames; in the SNR enhancement layer, each GOP starts with a forced EI frame followed by 89 EP (and possibly some EI) frames. Each GOP (across the layers) has a unique GOP identifier (GOPID) that allows all layers associated with a sub-section of the content to be addressed at random.

The layer configuration and the parameters (GOP size, etc.) may be modified as required. For example, a content author may have the ability to decide the type of enhancement layer to provide for different segments of the video content (e.g., providing temporal enhancement layers for fast action sub-sequences, SNR enhancement for sub-sequences with additional detail such as text, etc.). Moreover, there may be more than one enhancement layer created for a given segment (to accommodate the case where the user may choose to initiate multiple replays of the same subsequence with each iteration of the replay providing some type of incremental quality benefit). However, irrespective of the type of enhancement chosen, the entire stream may be composed of independently decodable layered segments called GOPs herein. The length of the GOP is another variable that the content provider may set. In one embodiment, the GOP size remains constant over the duration of the content. The scalability configuration described herein is an example of one embodiment and not the only stream configuration that may be used with the present invention. Furthermore, the data rates, frame rates, and image sizes are but one example of a layered stream configuration. One skilled in the art will appreciate that these parameters may be changed in other embodiments and this specific example will not serve to limit the scope of the present invention.

When the communications path comprise a fixed, relatively low data rate connection such as the Internet, for example, the transmission bandwidth dictates, at least in part, the quality of the compressed digital video. For example, if video data is being transmitted over a 25K BPS channel, compression artifacts may be evident when the video data is displayed to a user.

At various times when viewing multimedia content, a user may desire to replay a segment of video that was just transmitted from the server, received by the client, and displayed to the user. For example, assume that the user desires to view the previous 30 seconds or 60 seconds of video again, but with a higher quality image. Since the video data was streamed from the server system to the client system in real-time, either a retransmission of the original video data will take place or the video data will be stored upon original reception for subsequent replay. However, in either case, the quality of the image during replay would be the same as when the image was first displayed because the same video data is being used to generate the subsequent display. To overcome this limitation, an embodiment of the present invention uses the layered video streams capability of H.263+ to produce a higher quality replay for a limited bandwidth communications path.

Figure 4:
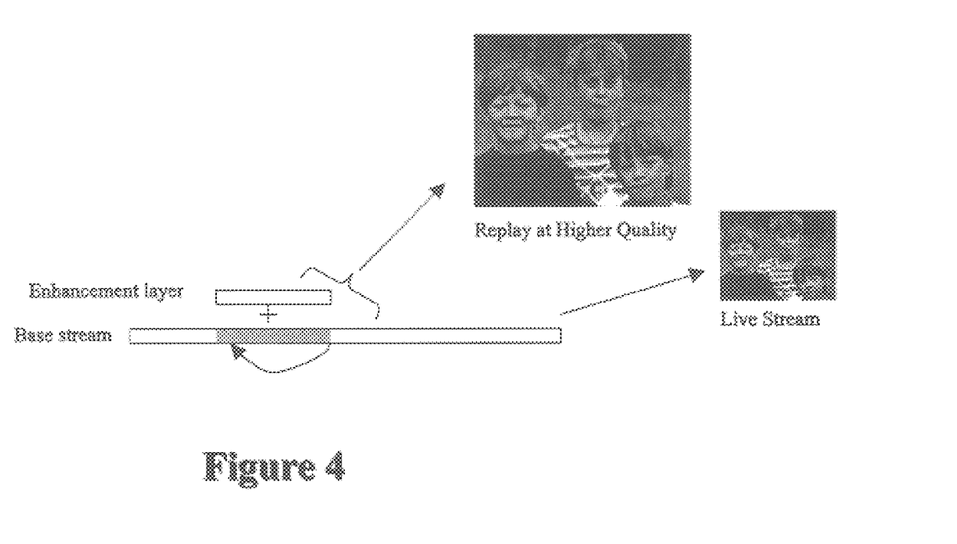
FIG. 4 is a diagram illustrating a base layer and an enhancement layer used to provide a high quality replay image according to an embodiment of the present invention.

Referring back to FIG. 2, while the original video data is being received in a base layer 52 of the video stream, the data may be stored by client system 44 in the client cache 50. When a request is received by the graphical user interface 48 to provide replay for a selected video segment, server system 32 sends additional video data for the selected video segment in one or more enhancement layers 54. The data from the enhancement layers may be added by the client system to the data from the base layer stored in the client cache to produce a higher quality image. FIG. 4 is a diagram illustrating a base layer and an enhancement layer used to provide a higher quality replay image according to an embodiment of the present invention. In this example, a spatial enhancement layer is employed to enlarge the replayed image.

In one embodiment, initialization, buffering and synchronization (when replay is requested) of a replay on demand capability may be accomplished as follows. When the client system "connects" to the server system and requests a video content to be streamed, the server system may send information, called a catalog, to the client system informing the client about global properties of the stream. The catalog may comprise information items such as stream information (source, title, author, copyright, etc.), format (video size, coding algorithm, etc.) and other video attributes (sequence length, optimal display size, optimal post-processing options, etc.). The catalog may also include the following two additional pieces of information:

Boolean IsReplaySupported; // TRUE if replay capability is available, FALSE otherwise.

Integer GOPSize; // # of frames in a GOP if IsReplaySupported=TRUE, undefined otherwise.

These two catalog items inform the client system whether the replay capability is supported by the user-selected content or not and if so, what the GOP size is for the particular stream. The GOP size information may be useful from the client's perspective since it determines the GOP boundaries. Note that due to the fact that key frames may be inserted at non-GOP boundaries by the encoder, it may be difficult to infer the GOP size simply from the stream; some additional information is therefore necessary to mark GOP boundaries.

In the case where more than one enhancement layer is available, the client system does not need to be told about the number of layers and the profile of each layer since such information is available from the stream. In this case, however, the client system may cache not only the base layer of the stream, but also every transmitted enhancement layer as well.

In one embodiment, the GOP size information used to set up the stream buffer in the client cache of the client system may be implemented as follows. Note that a GOP is the smallest independent unit of the stream that can be decoded independently (in a layered fashion). Therefore, the buffer allocated in the client system may be structured such that it can cache an integer number of previously decoded GOPs. There may be an additional buffer for the GOP that is currently being decoded by the decoder. Various sizes for the first buffer may be employed. This number may be set by the user (via the graphical user interface) or be assigned arbitrarily (with an option provided to the user to change it if required).

Figure 5:
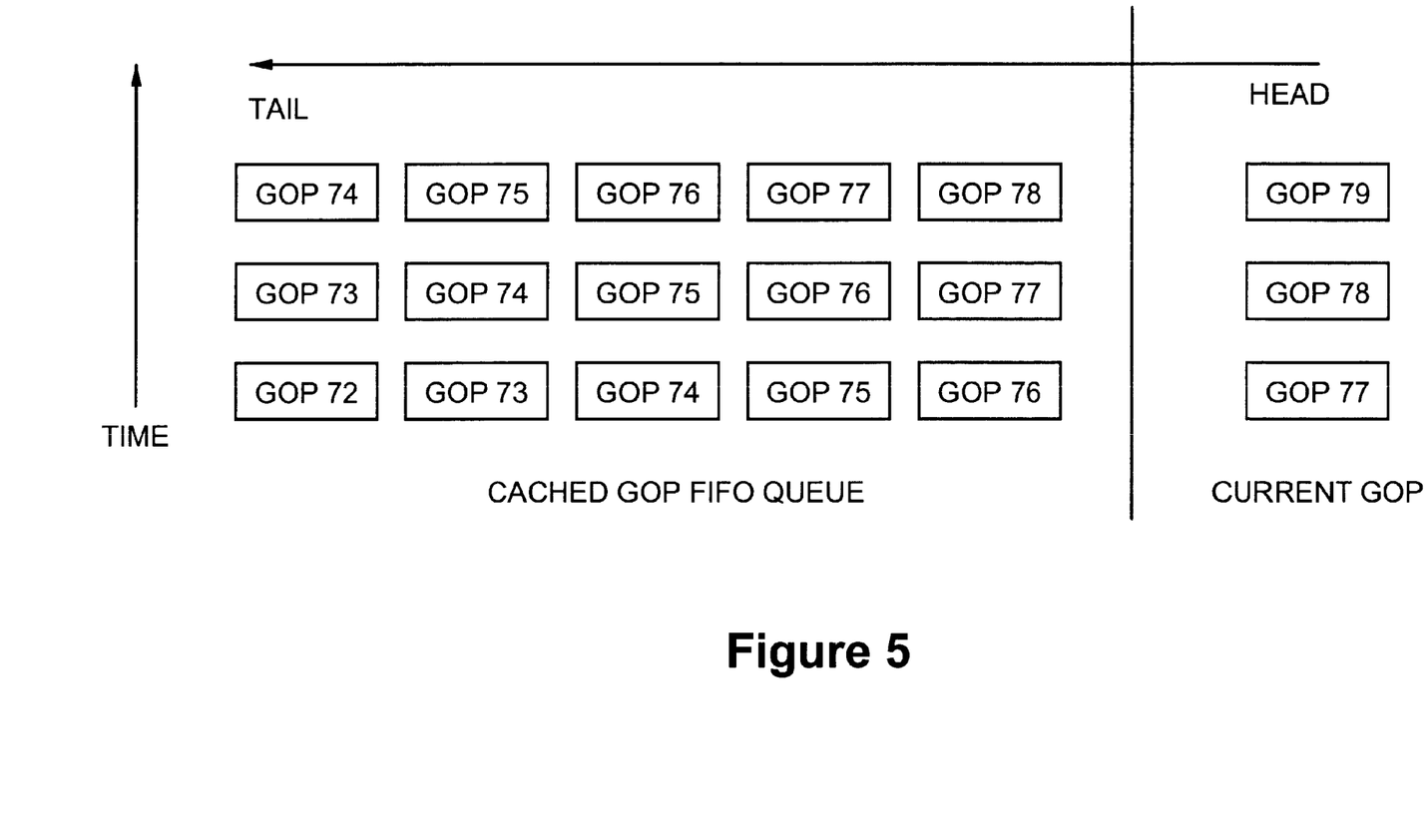
FIG. 5 is a diagram illustrating a buffer mechanism employed in an embodiment of the present invention.

In one embodiment, the GOP buffer containing stream data may be maintained as a first-in, first-out (FIFO) linked-list, although other data structures may also be employed. Since the number of bytes per GOP is variable, memory may be allocated dynamically per GOP. Consistent with the definition of a FIFO linked-list, as a GOP is completely decoded, it may be moved into the FIFO queue head position while the temporally "oldest" GOP may be discarded; the intermediate GOPs are shifted by one GOP position towards the tail of the queue. FIG. 5 describes this buffering mechanism. As demonstrated in FIG. 5, the FIFO queue may be updated when the current GOP has been completely received/decoded. Although the figure shows the individual GOPs in the FIFO queue being of equal size (in bytes), this is not necessarily the case since the number of bytes per GOP may vary. The GOP numbers indicate GOPIDs. In this example, the GOPIDs are assigned sequentially starting from 1.

In one embodiment where the stream contains one SNR enhancement layer, synchronization between the client system and the server system, when the user actually initiates a replay request, may be achieved as follows. When the user requests replay of a video segment, assume for purposes of example that the client system has just completed receiving/decoding the base layer frame number 36 of GOP 77. Upon notification of the replay request, the client system saves the last decoded frame and records the last decoded frame number in the GOP (in this case, frame number 36). In one embodiment, the client system may also send an information packet back to the server system containing the following information:

Integer CurrentGOPID; // GOPID of the interrupted GOP—set to 77 for our example     Integer CurrentFrameNum; // Frame number of the last decoded frame—set to 36 for our example     Integer RequestedGOPID; // GOPID of the GOP from which to start replay—set to 72 for our example The <CurrentGOPID,CurrentFrameNum> information informs the server system where to stop transmission of the enhancement layer (and to continue transmission once the enhancement layer has been transmitted or the replay has been aborted by the user). The RequestedGOPID information informs the server system the GOP from which to start transmitting information for the enhancement layer. Note that the server system may transmit GOPs for the enhancement layer starting from GOPID=RequestedGOPID and end transmission upon sending frame number CurrentFrameNum of CurrentGOPID. An assumption for this example is that the server system can address streams associated with individual frames in the sequence. The client system receives the stream data for the enhancement layer and combines it with the cached base layer stream data to present the decoded video to the user. Once the server system completes the transmission of the enhancement layer stream, it continues with the transmission of the base layer stream from frame number CurrentFrameNum+1 in GOP CurrentGOPID. The client system continues with decoding the base layer using the saved base layer frame stream corresponding to CurrentFrameNum.

In the event that a replay is requested before a single GOP has been completely received, the client system may choose to reject the replay request. Note also, that when a replay request is issued prior to the complete FIFO queue being filled, the replay time will be less. In another example, the original base layer may be transmitted at 25K BPS and the enhancement layer may be transmitted at 25K BPS. Thus, the effective data rate of the replay becomes 50K BPS and proportionately better quality. The enhancement layer may be a SNR, spatial, or temporal enhancement layer, or a combination of one or more of these layers based on user input.

For example, if spatial layer is added, the resulting replay image may be four times as large as the original image. Additionally, by using a temporal layer, the replay may be viewed in slow motion, if desired, but with a higher quality because the resulting frame rate of the displayed image is higher than as originally displayed. This slow motion capability may be enhanced using well-known inter-frame synthesis techniques as is used in analog broadcast television.

The effects of the enhancement layers to the displayed replay image may be further improved by repeatedly replaying the same video segment and adding additional enhancement layers on each iteration. The more layers that are added to the image, the better the quality. For example, a first request for an replay may generate a replayed image comprising a base layer and an SNR enhancement layer. A second request may generate a replayed image comprising the base and SNR layers plus a temporal layer. A third request may generate a replayed image comprising the base, SNR, temporal and spatial layer. The multiple enhancement layers received by the client system may be stored in the client cache, provided that there is available storage. Thus, a layered hierarchy of enhancement layers may be employed, as long as the server system creates the specific configuration used and communicates this configuration information to the client system.

When the multimedia content being transmitted represents a live event, server system 32 transmits video data representing the live event on the base layer of the stream. Prior to transmission of the base layer, the server system encodes the base layer and the enhancement layers and stores the enhancement layers in the server cache 38 for future use during replay. One skilled in the art will realize that the amount of data stored in either the server cache (enhancement layer data) and the client cache (base layer data) may be dependent upon particular implementations of the server system and client system, respectively. In one embodiment, the server cache and client cache may store video data representing 30 seconds of displayed images. This data may be continually replaced in the caches in a rolling 30 second window, for example. Accordingly, the caches may be implemented as circular buffers, although other data structures may also be employed.

Figure 6:
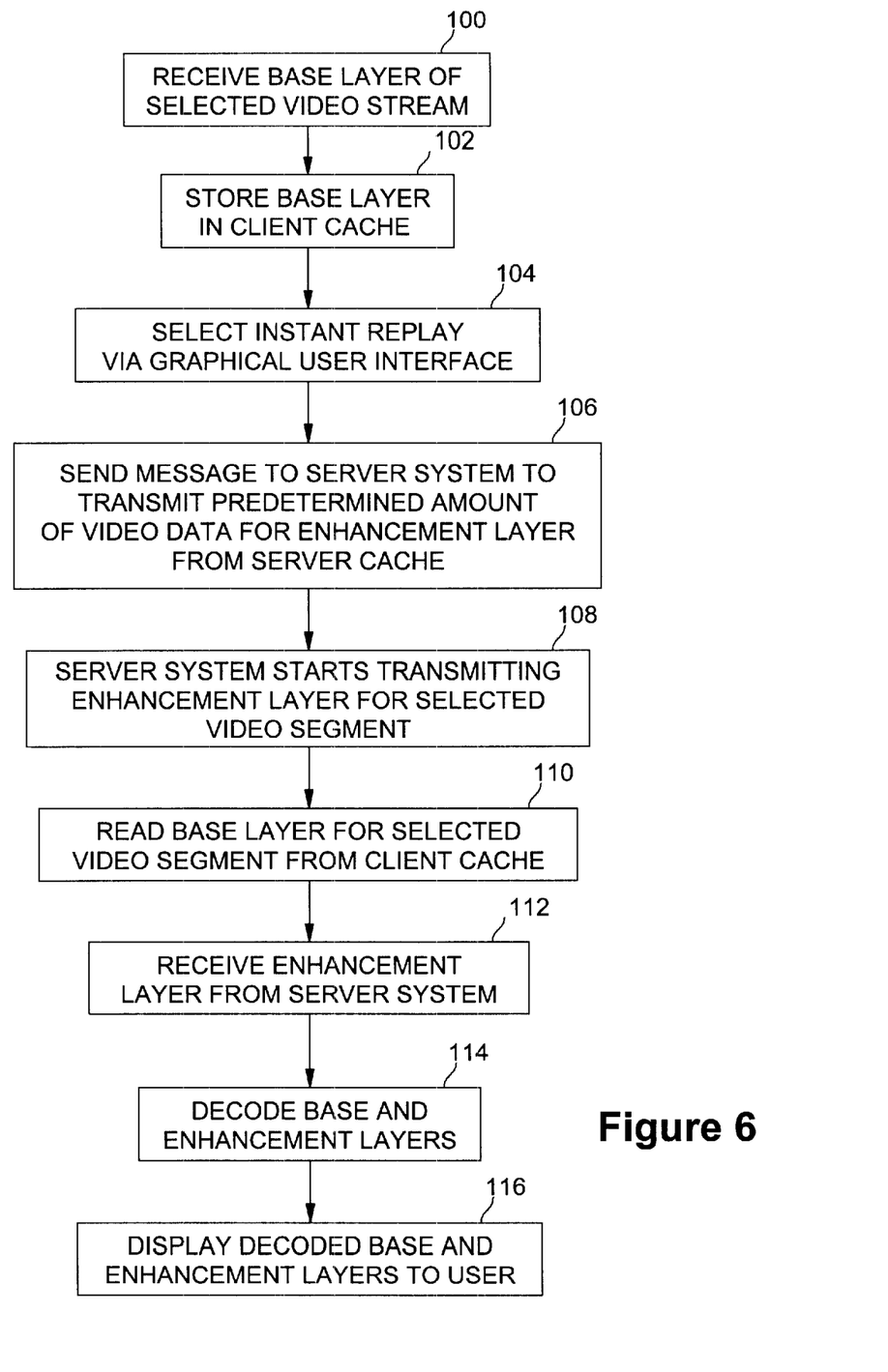
FIG. 6 is a flow diagram of providing instant replay of streaming digital video according to an embodiment of the present invention.

FIG. 6 is a flow diagram of a method of providing high quality replay of streaming digital video according to an embodiment of the present invention. When a user of a client system desires to view streaming digital video, the client system contacts the server system to initiate the transmission of a digital video stream and/or an associated audio stream corresponding to selected multimedia content (either prerecorded or live). At block 100, the client system receives the base layer of the selected video stream. In one embodiment, the video data in the base layer may be compressed according to the H.263+ specification. The client system stores at least a portion of the received base layer in the client cache at block 102 (that is, a rolling window of base layer data). The amount of compressed video data stored is dependent, at least in part, on the particular implementation of the client system and a memory, such as the client cache, may comprise different amounts of storage in different implementations. As the compressed video data is being stored in the client cache, the decoder decompresses and decodes the video data from the base layer of the video stream. The decoded and decompressed video data may be displayed to the user at a first quality level by the graphical user interface. The quality level may be defined by the frame rate and/or the amount of data per frame. This reception, decoding, and displaying processing continues for the video stream until a control request is received from the user.

At some point in time while viewing the streaming digital video, the user may desire to replay an immediately preceding portion of the video (i.e., show an "instant replay"). The user then selects a replay request via the graphical user interface at block 104. This may be implemented by depression of a specific replay key on the keyboard, by selection by a pointing device such as a mouse, for example, of a graphical button displayed to the user, or by other well-known input techniques. The request for a replay may be fielded by the graphical user interface of the client system, which directs the client to send a message to the server system to transmit a predetermined amount of video data for an enhancement layer from the server cache to the client at block 106. This predetermined amount of video data may be termed a video segment. In one embodiment, the amount of video data represents 30 seconds or 60 seconds of display time, however, other amounts may also be employed. The enhancement layer corresponds to the base layer transmitted to the client in the previous time period, such as 30 seconds or 60 seconds, for example. The enhancement layer data may be read from the server cache on the server system prior to transmission.

At block 108, the server system starts transmitting the enhancement layer for the selected video segment to be replayed. At the client system, the decoder reads the base layer of the selected video segment to be replayed from the client cache at block 110. At block 112, the enhancement layer may be received from the server system. Blocks 110 and 112 may be performed concurrently by the client system. The decoder decodes and decompresses the base and enhancement layers for the selected video segment at block 114. At block 116, the decoded base and enhancement layers may be displayed to the user. Since the amount of video data decoded and displayed to the user for the video segment is now greater than previously, the video segment being replayed is displayed at a second quality level, which is of higher quality than the first level. The quality level may be defined by the frame rate and/or the amount of data per frame. Higher quality may result in the user's perception of smoother images (due to temporal enhancement), larger images (due to spatial enhancement), or clearer images (due to SNR enhancement). This result may be accomplished without an increase in the bandwidth of the communications path between the server system and the client system. Further controls may be provided to the user via the graphical user interface to terminate the replay feature and return to normal digital video streaming of the selected multimedia content.

In the preceding description, various aspects of the present invention have been described. For purposes of explanation, specific numbers, systems and configurations were set forth in order to provide a thorough understanding of the present invention. However, it is apparent to one skilled in the art that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 7:
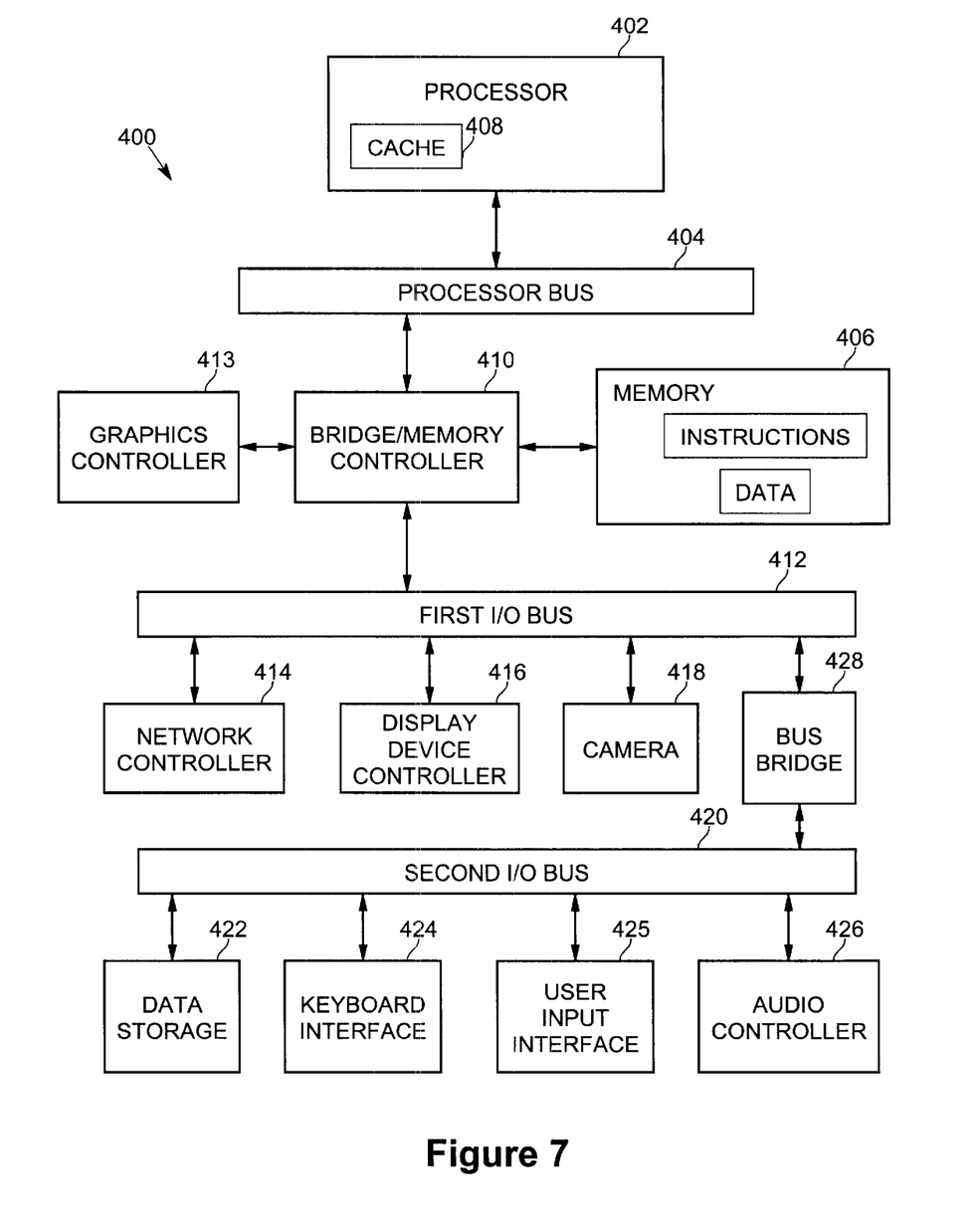
FIG. 7 is a diagram illustrating a sample system suitable to be programmed according to an embodiment of a method of providing a replay on demand feature for streaming digital video in accordance with the present invention.

An example of one such type of processing system is shown in FIG. 7. Sample system 400 may be used, for example, to execute the processing for methods employed by the client system and/or the server system, in accordance with the present invention, such as the embodiment described herein. Sample system 400 is representative of processing systems based on the PENTIUM®, PENTIUM® Pro, and PENTIUM® II microprocessors available from Intel Corporation, although other systems (including personal computers (PCs) having other microprocessors, engineering workstations, set-top boxes and the like) may also be used. In one embodiment, sample system 400 may be executing a version of the WINDOWS™ operating system available from Microsoft Corporation, although other operating systems and graphical user interfaces, for example, may also be used.

FIG. 7 is a block diagram of a system 400 of one embodiment of the present invention. The computer system 400 includes a processor 402 that processes data signals. The processor 402 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 7 shows an example of an embodiment of the present invention implemented as a single processor system 400. However, it is understood that embodiments of the present invention may alternatively be implemented as systems having multiple processors. Processor 402 may be coupled to a processor bus 404 that transmits data signals between processor 402 and other components in the system 400.

System 400 includes a memory 406. Memory 406 may be a dynamic random access memory (DRAM) device, a static random access memory (SRAM) device, or other memory device. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406. Cache memory 408 in this embodiment speeds up memory accesses by the processor by taking advantage of its locality of access. Alternatively, in another embodiment, the cache memory may reside external to the processor.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In some embodiments, the bridge/memory controller provides a graphics port for coupling to a graphics controller 413. In this embodiment, graphics controller 413 interfaces to a display device (not shown) for displaying images rendered or otherwise processed by the graphics controller 413 to a user. The display device may comprise a television set, a computer monitor, a flat panel display, or other suitable display device.

First I/O bus 412 may comprise a single bus or a combination of multiple buses. First I/O bus 412 provides communication links between components in system 400. A network controller 414 may be coupled to the first I/O bus 412. The network controller links system 400 to a network that may include a plurality of processing systems (not shown in FIG. 3) and supports communication among various systems. The network of processing systems may comprise a local area network (LAN), a wide area network (WAN), the Internet, or other network. In some embodiments, a display device controller 416 may be coupled to the first I/O bus 412. The display device controller 416 allows coupling of a display device to system 400 and acts as an interface between a display device (not shown) and the system. The display device may comprise a television set, a computer monitor, a flat panel display, or other suitable display device. The display device receives data signals from processor 402 through display device controller 416 and displays information contained in the data signals to a user of system 400.

In some embodiments, camera 418 may be coupled to the first I/O bus to capture live events. Camera 418 may comprise a digital video camera having internal digital video capture hardware that translates a captured image into digital graphical data. The camera may comprise an analog video camera having digital video capture hardware external to the video camera for digitizing a captured image. Alternatively, camera 418 may comprise a digital still camera or an analog still camera coupled to image capture hardware. A second I/O bus 420 may comprise a single bus or a combination of multiple buses. The second I/O bus 420 provides communication links between components in system 400. A data storage device 422 may be coupled to the second I/O bus 420. The data storage device 422 may comprise a hard disk drive, a floppy disk drive, a CD-ROM device, a flash memory device, or other mass storage device. Data storage device 422 may comprise one or a plurality of the described data storage devices.

A keyboard interface 424 may be coupled to the second I/O bus 420. Keyboard interface 424 may comprise a keyboard controller or other keyboard interface device. Keyboard interface 424 may comprise a dedicated device or may reside in another device such as a bus controller or other controller device. Keyboard interface 424 allows coupling of a keyboard to system 400 and transmits data signals from a keyboard to system 400. A user input interface 425 may be coupled to the second I/O bus 420. The user input interface may be coupled to a user input device, such as a mouse, joystick, or trackball, for example, to provide input data to the computer system. Audio controller 426 may be coupled to the second I/O bus 420. Audio controller 426 operates to coordinate the recording and playback of audio signals. A bus bridge 428 couples first I/O bridge 412 to second I/O bridge 420. The bus bridge operates to buffer and bridge data signals between the first I/O bus 41 2 and the second I/O bus 420.

Embodiments of the present invention are related to the use of the system 400 to provide a high quality replay on demand for streaming digital video. According to one embodiment, provision of a high quality replay on demand for streaming digital video may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to provide a high quality replay on demand for streaming digital video according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions well-known in the art. In particular, data storage device 422 may be used to provide long-term storage for the executable instructions and data structures for embodiments of methods of providing high quality replay on demand for streaming digital video in accordance with the present invention, whereas memory 406 is used to store on a shorter term basis the executable instructions of embodiments of the methods for providing high quality replay on demand for streaming digital video in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of replaying on demand of a multimedia segment received in a digital multimedia stream representing the multimedia segment on a limited bandwidth communications path, the method comprising:

storing at least a portion of a first layer of the digital multimedia stream in a memory;

requesting transmission of a second layer from a server system;

receiving the second layer of the digital multimedia stream corresponding to the stored portion of the first layer over the limited bandwidth communications path;

reading the stored portion of the first layer from the memory;

decoding the stored portion of the first layer and the received second layer; and displaying the decoded first and second layers to the user.

2. The method of claim 1, wherein the first layer comprises a base layer and the second layer comprises an enhancement layer.

3. The method of claim 2, wherein the enhancement layer comprises at least one of a signal-to-noise ratio (SNR) enhancement layer, a spatial enhancement layer, and a temporal enhancement layer.

4. The method of claim 1, wherein the multimedia segment represents live events captured and transmitted to a client system.

5. The method of claim 1, wherein the multimedia segment represents pre-recorded multimedia content.

6. The method of claim 1, further comprising receiving a request to replay the multimedia segment at a higher quality than an original display of the multimedia segment.

7. A method of providing replay on demand of a multimedia segment obtained from a signal source by a server system, a first portion of the multimedia segment being transmitted as a first layer in a digital multimedia stream on a limited bandwidth communications path to a client system, the method comprising:

storing a second portion of the multimedia segment as at least one second layer in a memory in the server system;

receiving a request for replay service of the multimedia segment from the client system;

reading the at least one second layer from the memory; and transmitting the at least one second layer in the digital multimedia stream to the client system.

8. The method of claim 7, further comprising transmitting the first layer to the client system concurrently with storing the second portion.

9. The method of claim 7, further comprising encoding the at least one second layer prior to transmission.

10. The method of claim 7, wherein the first layer comprises a base layer and the second layer comprises an enhancement layer.

11. The method of claim 10, wherein the enhancement layer comprises at least one of a signal-to-noise ratio (SNR) enhancement layer, a spatial enhancement layer, and a temporal enhancement layer.

12. The method of claim 7, wherein the multimedia segment represents live events captured and transmitted to the client system.

13. The method of claim 7, wherein the multimedia segment represents pre-recorded multimedia content.

14. A method of providing replay on demand of a video segment having digital video data signals, the video segment being transmitted as a stream, the stream being received by a client system from a server system on a limited bandwidth communications path, the method comprising:

receiving a base layer of the stream, decoding the base layer and displaying the decoded base layer at a first quality level;

storing at least a portion of the base layer in a memory in the client system;

receiving a request for replay for the video segment from a user of the client system;

receiving at least one enhancement layer of the stream corresponding to the stored portion of the base layer;

reading the stored portion of the base layer from the memory;

decoding the stored portion of the base layer and the at least one enhancement layer; and displaying the decoded base and enhancement layers at a second quality level.

15. The method of claim 14, wherein the base and enhancement layers represent live events captured and transmitted to the client system in real-time.

16. The method of claim 14, wherein the enhancement layer comprises at least one of a signal-to-noise ratio (SNR) enhancement layer, a spatial enhancement layer, and a temporal enhancement layer.

17. The method of claim 14, wherein the second quality level is higher than the first quality level.

18. A method of providing replay on demand of a video segment having digital video data signals, the video segment being transmitted as a stream by a server system to a client system on a limited bandwidth communications path, the method comprising:

transmitting a first portion of the video segment as a base layer of the stream to the client system;

storing a second portion of the video segment, the second portion corresponding to the first portion, as at least one enhancement layer in a memory in the server system;

receiving a request for replay service of the video segment;

reading the second portion from the memory; and transmitting the second portion as the at least one enhancement layer in the stream to the client system.

19. An apparatus for providing replay on demand of a multimedia segment having digital multimedia data signals comprising:

a decoder to receive and decode a base layer of a stream representing the multimedia segment and to receive and decode an enhancement layer of the stream, the enhancement layer corresponding to the base layer; and a graphical user interface, coupled to the decoder to display the decoded base layer of the stream as an original display of the multimedia segment at a first quality level, to receive a request for replay of the multimedia segment, and to display the decoded base layer and the decoded enhancement layer of the multimedia segment at a second quality level in response to the request.

20. The apparatus of claim 19, wherein the second quality level is higher than the first quality level.

21. An apparatus for providing replay on demand service for a streaming multimedia segment having digital multimedia data signals, comprising:

a source of the multimedia segment;

a memory to store at least a first portion of the multimedia segment; and an encoder, coupled to the source and the memory, to receive the multimedia segment from the source, to encode a second portion of the multimedia segment as a first layer in a stream, to transmit the first layer of the stream to a client system for an original display of the multimedia segment, to receive a request for replay service, and to retrieve the first portion of the multimedia segment from the memory and transmit the first portion as a second layer in the stream to the client system for a replay display of the multimedia segment in response to the request.

22. The apparatus of claim 21, wherein the source comprises a storage medium having pre-recorded multimedia content.

23. The apparatus of claim 21, wherein the source comprises a camera capturing live events.

24. The apparatus of claim 21, wherein the first layer comprises a base layer and the second layer comprises an enhancement layer.

25. An article comprising a machine readable medium having a plurality of machine readable instructions, wherein when the instructions are executed by a processor, the instructions cause a multimedia segment received in a digital multimedia stream representing the multimedia segment on a limited bandwidth communications path to be replayed by storing at least a portion of a first layer of the digital multimedia stream in a memory, requesting transmission of a second layer from a server system, by receiving the second layer of the digital multimedia stream corresponding to the stored portion of the first layer over the limited bandwidth communications path, by reading the stored portion of the first layer from the memory, by decoding the stored portion of the first layer and the received second layer, and by displaying the decoded first and second layers to the user.

26. An article comprising a machine readable medium having a plurality of machine readable instructions, wherein when the instructions are executed by a processor, the instructions cause replay of a multimedia segment obtained from a signal source by a server system, a first portion of the multimedia segment being transmitted as a first layer in a digital multimedia stream over a limited bandwidth communications path to a client system, by storing a second portion of the multimedia segment as at least one second layer in a memory in the server system, by receiving a request for replay service of the multimedia segment from the client system, by reading the at least one second layer from the memory, and by transmitting the at least one second layer in the digital multimedia stream to the client system.

27. An article comprising a machine readable medium having a plurality of machine readable instructions, wherein when the instructions are executed by a processor, the instructions cause replay of a multimedia segment having digital multimedia data signals, the multimedia segment being transmitted as a stream, the stream being received by a client system from a server system on a limited bandwidth communications path, by receiving a base layer of the stream, by decoding the base layer and displaying the decoded base layer at a first quality level, by storing at least a portion of the base layer in a memory in the client system, by receiving a request for replay service for the multimedia segment from a user of the client system, by receiving at least one enhancement layer of the stream corresponding to the stored portion of the base layer, by reading the stored portion of the base layer from the cache; by decoding the stored portion of the base layer and the at least one enhancement layer, and by displaying the decoded base and enhancement layers at a second quality level.

28. An article comprising a machine readable medium having a plurality of machine readable instructions, wherein when the instructions are executed by a processor, the instructions cause replay of a multimedia segment having digital multimedia data signals, the multimedia segment being transmitted as a stream by a server system to a client system on a limited bandwidth communications path, by transmitting a first portion of the multimedia segment as a base layer of the stream to the client system, by storing a second portion of the multimedia segment, the second portion corresponding to the first portion, as at least one enhancement layer in a memory in the server system, by receiving a request for replay service of the multimedia segment, by reading the second portion from the memory, and by transmitting the second portion as the at least one enhancement layer in the stream to the client system.

29. The article of claim 25, wherein the first layer comprises a base layer and the second layer comprises an enhancement layer.

30. The article of claim 29, wherein the enhancement layer comprises at least one of a signal-to-noise ratio (SNR) enhancement layer, a spatial enhancement layer, and a temporal enhancement layer.

31. The article of claim 25, wherein the multimedia segment represents live events captured and transmitted to a client system.

32. The article of claim 25, wherein the multimedia segment represents pre-recorded multimedia content.

33. The article of claim 25, further comprising instructions for receiving a request to replay the multimedia segment at a higher quality than an original display of the multimedia segment.

34. The article of claim 26, further comprising instructions for transmitting the first layer to the client system concurrently with storing the second portion.

35. The article of claim 26, further comprising instructions for encoding the at least one second layer prior to transmission.

36. The article of claim 26, wherein the first layer comprises a base layer and the second layer comprises an enhancement layer.

37. The article of claim 36, wherein the enhancement layer comprises at least one of a signal-to-noise ratio (SNR) enhancement layer, a spatial enhancement layer, and a temporal enhancement layer.

38. The article of claim 26, wherein the multimedia segment represents live events captured and transmitted to the client system.

39. The article of claim 26, wherein the multimedia segment represents pre-recorded multimedia content.

40. The article of claim 26, wherein the base and enhancement layers represent live events captured and transmitted to the client system in real-time.

41. The article of claim 27, wherein the enhancement layer comprises at least one of a signal-to-noise ratio (SNR) enhancement layer, a spatial enhancement layer, and a temporal enhancement layer.

42. The article of claim 27, wherein the second quality level is higher than the first quality level.

* * * * *

UNITED STATES PATENT AND TRADEMARK OFFICE
CERTIFICATE OF CORRECTION

PATENT NO.    : 6,496,980 B1                                           Page 1 of 1
DATED         : December 17, 2002
INVENTOR(S)   : Tillman et al.

It is certified that error appears in the above-identified patent and that said Letters Patent is hereby corrected as shown below:

<u>Column 4,</u>
Line 9, delete "Source 118, Source 220", insert -- Source 1 18, Source 2 20 --.

Signed and Sealed this

Fifteenth Day of April, 2003

JAMES E. ROGAN
*Director of the United States Patent and Trademark Office*